(12) United States Patent
Morita et al.

(10) Patent No.: US 10,576,808 B2
(45) Date of Patent: Mar. 3, 2020

(54) GLASS ARTICLE

(71) Applicant: AGC Inc., Chiyoda-ku (JP)

(72) Inventors: Shimpei Morita, Chiyoda-ku (JP);
Hirokazu Kodaira, Chiyoda-ku (JP);
Masahiro Yamazaki, Chiyoda-ku (JP);
Syo Miyazaki, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 71 days.

(21) Appl. No.: 15/948,067

(22) Filed: Apr. 9, 2018

(65) Prior Publication Data

US 2018/0222291 A1     Aug. 9, 2018

Related U.S. Application Data

(63) Continuation of application No. PCT/JP2016/084265, filed on Nov. 18, 2016.

(30) Foreign Application Priority Data

Nov. 20, 2015  (JP) .................................. 2015-227439

(51) Int. Cl.
*B60J 1/16*     (2006.01)
*B60J 1/00*     (2006.01)
(Continued)

(52) U.S. Cl.
CPC ............. *B60J 1/006* (2013.01); *C03C 17/009* (2013.01); *C03C 17/28* (2013.01); *E05F 11/38* (2013.01);
(Continued)

(58) Field of Classification Search
CPC ....... E05F 11/385; E05F 11/38; E05F 11/445; E05F 11/535; B60J 1/006
(Continued)

(56) References Cited

U.S. PATENT DOCUMENTS 4,987,699 A * 1/1991 Gold .......................... B60J 1/17
156/107
5,765,310 A * 6/1998 Gold .......................... B60J 1/17
49/375
(Continued)

FOREIGN PATENT DOCUMENTS

EP    3495181 A1 *  6/2019 ............ E05F 11/385
JP    3473833       12/2003
(Continued)

OTHER PUBLICATIONS

Extended European Search Report dated Jun. 21, 2019 in Patent Application No. 16866438.1, citing documents AA, AB, and AO therein, 8 pages.

(Continued)

*Primary Examiner* — Jerry E Redman
(74) *Attorney, Agent, or Firm* — Oblon, McClelland, Maier & Neustadt, L.L.P.

(57) ABSTRACT

A glass article which has: a glass plate having a contour shape having an upper edge and a lower edge; a functional film formed on at least one of principal surfaces of the glass plate; and a holder having a recessed portion into which the lower edge of the glass plate is fitted, wherein the functional film has a first coverage area and a second coverage area, the second coverage area being formed in a manner to cover the principal surface, the first coverage area being formed on a lower side of the second coverage area, and a maximum film thickness of the first coverage area being smaller than a maximum film thickness of the second coverage area, and the holder is provided on a lower edge side of the glass plate, within the first coverage area of functional film, via an adhesive in the recessed portion.

10 Claims, 6 Drawing Sheets

(51) Int. Cl.
*E05F 11/38* (2006.01)
*C03C 17/00* (2006.01)
*C03C 17/28* (2006.01)
*E05F 11/44* (2006.01)
*E05F 11/53* (2006.01)

(52) U.S. Cl.
CPC ...... *E05F 11/385* (2013.01); *C03C 2217/445* (2013.01); *C03C 2217/475* (2013.01); *C03C 2217/48* (2013.01); *E05F 11/445* (2013.01); *E05F 11/535* (2013.01); *E05Y 2600/526* (2013.01)

(58) Field of Classification Search
USPC .......................................................... 49/375
See application file for complete search history.

(56) References Cited

U.S. PATENT DOCUMENTS

| | | | | |
|---|---|---|---|---|
| 6,044,589 A * | 4/2000 | Dallos, Jr. | ............. | E05F 11/445 49/375 |
| 6,170,197 B1 * | 1/2001 | Tyves | .................... | E05F 11/385 49/358 |
| 7,340,861 B2 * | 3/2008 | Jackson, II | ....... | B32B 17/10036 49/375 |
| 2003/0093960 A1 * | 5/2003 | Mizusawa | ............. | E05F 11/385 52/204.62 |
| 2009/0072579 A1 | 3/2009 | Mori | | |
| 2009/0080066 A1 | 3/2009 | Muromachi et al. | | |

FOREIGN PATENT DOCUMENTS

| | | |
|---|---|---|
| JP | 2009-133094 | 6/2009 |
| JP | 2013-129576 A | 7/2013 |
| JP | 2014-111453 | 6/2014 |
| JP | 5733197 | 6/2015 |

OTHER PUBLICATIONS

International Search Report dated Jan. 31, 2017 in PCT/JP2016/084265 filed Nov. 18, 2016 (with English Translation).
Written Opinion dated Jan. 31, 2017 in PCT/JP2016/084265 filed Nov. 18, 2016.

* cited by examiner

GLASS ARTICLE

CROSS-REFERENCE TO RELATED APPLICATIONS

This application is a continuation of prior International Application No. PCT/JP2016/084265, filed on Nov. 18, 2016 which is based upon and claims the benefit of priority from Japanese Patent Application No. 2015-227439, filed on Nov. 20, 2015; the entire contents of all of which are incorporated herein by reference.

FIELD

The present invention relates to a glass article having a glass plate, a functional film provided on one of principal surfaces of the glass plate, and a holder provided in the glass plate.

BACKGROUND

It has been tried to make a vehicle window glass for an automobile or the like realize various functions by providing a functional film on a principal surface thereof. For example, it is tried to form a functional film having an ability to absorb ultraviolet ray incident into a vehicle and having mechanical durability such as abrasion resistance (for example, see Patent Reference 1(JP-A No. 2014-111453)).

A method is presented for providing an automobile window glass with a holder in order to mount the automobile window glass on a lifting and lowering device to lift and lower the automobile window glass (for example, see Patent Reference 2(JP-A No. 2009-133094)).

SUMMARY

However, in the automobile window glass with the functional film described in Patent Reference 1, a film thickness of the functional film on a lower edge side is larger than a film thickness of the functional film on an upper edge side of a glass plate when the window glass is installed in the vehicle. Accordingly, the film thicknesses of the functional film are different in a height direction of the glass plate, particularly, the film thickness of the functional film on the lower edge side being large, and thus there is a possibility that a failure occurs such as in adhesiveness between the functional film and the glass plate when the glass plate is provided with a holder.

A method for providing the holder in the automobile window glass is described in Patent Reference 2. However, Patent Reference 2 does not describe a relationship between a shape of the functional film formed on the automobile window glass and the holder, that is, what shape of the functional film makes the functional film hard to be peeled from the automobile window glass when the holder is to be mounted, and such a problem is not considered at all. Therefore, when the automobile window glass with the functional film described in Patent Reference 1 is mounted on the holder, due to non-uniformity of film thicknesses in a periphery of an end portion of the functional film on the glass plate on a side where the holder is mounted, there has been a problem that the functional film is likely to be peeled beginning from a periphery of the end portion when the holder is mounted.

An object of the present invention is to provide a glass article capable of suppressing peeling of a functional film when a holder is mounted on a glass plate provided with a functional film.

In order to achieve the aforementioned object, the present invention is a glass article which has: a glass plate having a contour shape having an upper edge and a lower edge; a functional film formed on at least one of principal surfaces of the glass plate; and a holder having a recessed portion into which the lower edge of the glass plate is fitted, wherein the functional film has a first coverage area and a second coverage area, the second coverage area being formed in a manner to cover the principal surface extending from the upper edge toward the lower edge of the glass plate, the first coverage area being formed on a lower side of the second coverage area, along the lower edge, and a maximum film thickness of the first coverage area being smaller than a maximum film thickness of the second coverage area, and the holder is provided on a lower edge side of the glass plate, within the first coverage area of functional film, via an adhesive in the recessed portion According to an embodiment of the present invention, it is possible to provide a glass article capable of suppressing peeling of a functional film when a holder is mounted on a glass plate provided with the functional film.

MODES FOR CARRYING OUT THE INVENTION

Hereinafter, an embodiment of the present invention will be described.

Figure 1:
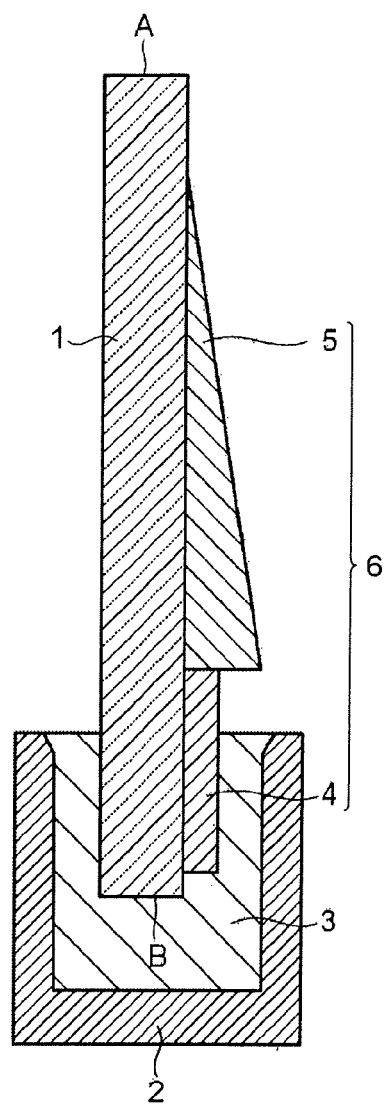
FIG. 1 is a side view illustrating one of examples of a glass article of the present invention.

FIG. 1 is a side view illustrating one of examples of a glass article of the present invention. As illustrated in FIG. 1, the glass article of the present invention has a glass plate 1, a functional film 6 formed on at least one of principal surfaces of the glass plate, and a holder 2 which supports a lower edge of the glass plate and has a recessed portion into which the lower edge of the glass plate 1 is fitted.

Note that the functional film is not limited to a film absorbing ultraviolet ray or a film absorbing ultraviolet ray and infrared ray and may be an antifogging film, a water-repellent film, or the like, for example.

In the drawings, some parts are exaggerated or simplified for explaining a mode of the glass article of the present invention, but a dimension, a size, a magnification, a structure, and so on of the glass article are not limited thereto and various modification and addition are possible.

The glass plate 1 has a contour shape having an upper edge A and a lower edge B. In a case where the glass plate 1 is used as a glass plate for a window of an automobile vehicle, for example, as a glass plate for a window of a front door or a rear door, the glass plate 1 is a curved or flat glass plate whose schematic shape is almost rectangular. In a case of the curved glass plate, there is usually used a curved glass plate with a concave surface on an indoor side and a convex surface on an outdoor side of the automobile vehicle. In a case where the functional film is the film absorbing ultraviolet ray or film absorbing the ultraviolet ray and the infrared ray, the functional film is preferably formed on the concave surface on the indoor side of the automobile vehicle.

The functional film 6 provided on the glass plate 1 has a first coverage area 4 and a second coverage area 5 from the lower edge toward the upper edge of the glass plate 1, and is provided in a manner that a maximum film thickness of the second coverage area 5 is larger than a maximum film thickness of the first coverage area 4.

Figure 2:
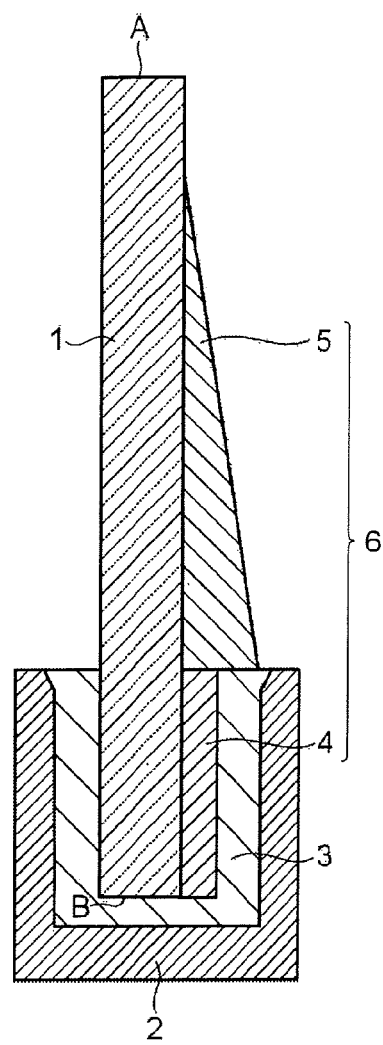
FIG. 2 is a side view illustrating another one of the examples of the glass article of the present invention.

FIG. 2 is a side view illustrating another one of the examples of the glass article of the present invention. Here, as illustrated in FIG. 1 and FIG. 2, there are illustrated the examples in which the second coverage areas of the functional films gradually increase from the upper edge sides toward the lower edge sides of the glass plates, but not being limited thereto, the functional film may have a form in which a second coverage area gradually increases from a lower edge side toward an upper edge side of a glass plate, or a second coverage area may have almost the same film thickness from an upper edge side toward a lower edge side of a glass plate.

In a case where the glass plate is a window glass used for a window for an automobile vehicle, the second coverage area 5 is preferably formed on a principal surface on an indoor side of the glass plate, and to cover a main area of the principal surface which extends from the upper edge toward the lower edge of the glass plate. Here, the main area of the principal surface is an area corresponding to an opening portion of the window in a case of the automobile vehicle. Further, similarly, the first coverage area is preferably formed on the surface on the indoor side of the glass plate, on a lower side of the second coverage area along the lower edge.

More specifically, in a case where the glass plate is a window glass mounted openably and closably by being lifted and lowered in a vertical direction in the opening portion of the window of the automobile vehicle, it is preferable that, when the glass plate is lifted to close the opening portion, the main area of the second coverage area is provided to be placed in an opening area of the opening portion and that the main area of the first coverage area is provided to be placed outside the opening area below the opening portion.

In the functional film provided on the glass plate, a maximum film thickness of the first coverage area is smaller than a maximum film thickness of the second coverage area. When the functional film is formed, due to its manufacturing method, a film thickness deviation often occurs in each of the first coverage area and the second coverage area. In such a case a difference between the maximum film thickness and a minimum film thickness in the first coverage area (that is, a film thickness difference in the first coverage area) is preferably smaller than a difference between the maximum film thickness and a minimum film thickness in the second coverage area (that is, a film thickness difference in the second coverage area). Note that the film thickness of the first coverage area and the film thickness of the second coverage area may be each uniform. Also in such a case, as described above, the maximum film thickness of the first coverage area is smaller than the maximum film thickness of the second coverage area. The first coverage area may include a part not having the functional film.

In a case where the functional film is provided on the glass plate, mounting a holder on the lower edge side of the glass plate via an adhesive inside the recessed portion causes a stress on the functional film provided on the glass plate. A difference in film thickness of the functional film generates a difference in largeness of the stress which works thereon. Since the small difference in film thickness of the functional film leads to the small difference in the generated stress, peeling of the functional film from the glass plate can be suppressed when the holder is mounted. Meanwhile, since the large difference in film thickness of the functional film leads to the large difference in the generated stress, peeling of the functional film from the glass plate becomes likely to occur when the holder is mounted. Therefore, in order to prevent peeling of the functional film from the glass plate, it is desired that the holder is provided in the first coverage area in which the difference between the maximum film thickness and the minimum film thickness is small (that is, the film thickness is more uniform) and whose film thickness is smaller.

If the functional film is manufactured by an exemplified manufacturing method of a glass article which will be described later, a difference is generated between the film thickness of the first coverage area and the film thickness of the second coverage area. Therefore, it is preferable that the holder is provided in a manner not to straddle a boundary region between the first coverage area and the second coverage area, since peeling of the functional film from the glass plate can be suppressed when the holder is mounted as described above.

Formation of the functional film on a glass plate surface can be attained by applying a coating solution being a liquid composition described later on the glass plate surface and performing a curing processing.

In order to provide the first coverage area and the second coverage area in the functional film provided on the glass plate, there can be cited a method in which, for example, after applying the coating solution on the principal surface of the glass plate, the glass plate on which the coating solution is applied is held with the coated surface upward, a part of the coating solution in a coated area positioned on the lower edge side of the glass plate and having a certain width from the lower edge side toward the upper edge side is removed by using a blade or the like to obtain a thinner film, and thereafter, the coating solution is cured to form the functional film.

A width of the first coverage area formed below the second coverage area of the functional film, that is, the width of the first coverage area from the lower edge toward the upper edge of the glass plate, is not limited in particular. More preferably, as described above, in a case where the glass plate is the window glass mounted openably and closably by being lifted and lowered in the vertical direction in the opening portion of the window of the automobile vehicle, it is preferable that, when the glass plate is lifted to close the opening portion, the main area of the first coverage area is provided to be positioned on the lower edge side of the window which is zoned below the opening portion (that is, outside the opening area of the opening portion of the window). In this case, the main area of the first coverage area is an area corresponding to a position at which the holder is mounted, and outside the opening area on the lower side of the opening portion in the glass plate. The main area of the first coverage area may straddle the area positioned on the lower edge side of the window which is zoned on the lower area of the opening portion and an area positioned outside the opening area on the lower side of the opening portion, in the glass plate.

A material of the holder is not limited in particular. When a resin is used, for example, there can be used one whose major constituent is a polybutylene terephthalate resin, a polyethylene terephthalate resin, or a polyamide resin.

Figure 3:
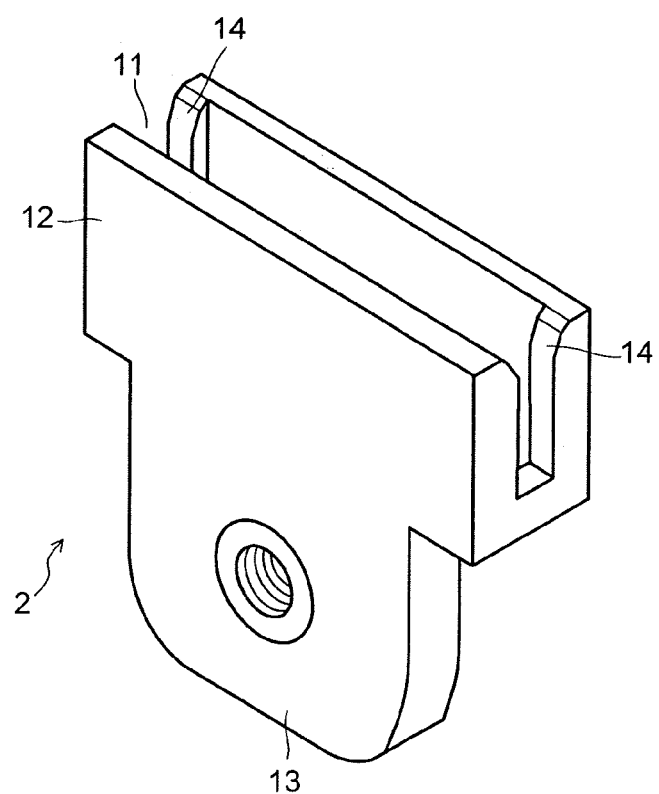
FIG. 3 is a perspective view illustrating an example of a holder applied to the glass article of the present invention.

FIG. 3 is a perspective view illustrating an example of a holder applied to the glass article of the present invention, Here, there is illustrated an example of a holder for a vehicle window glass to be mounted on a driving unit which vertically moves the glass article of the present invention in an opening portion of a window or a door for an automobile vehicle. A holder 2 has a main body portion 12 having a recessed portion 11 which fits a glass plate (not illustrated) therein to sandwich it, and a leg portion 13 to be mounted on the driving unit which lifts and lowers the glass plate in the vertical direction. Besides, projecting portions 14 for stemming, to prevent running over of an adhesive infused into the recessed portion, are provided on both end sides of the groove-shaped recessed portion 11 of the main body portion 12 in a manner to project toward inside of the recessed portion 11.

Figure 4:
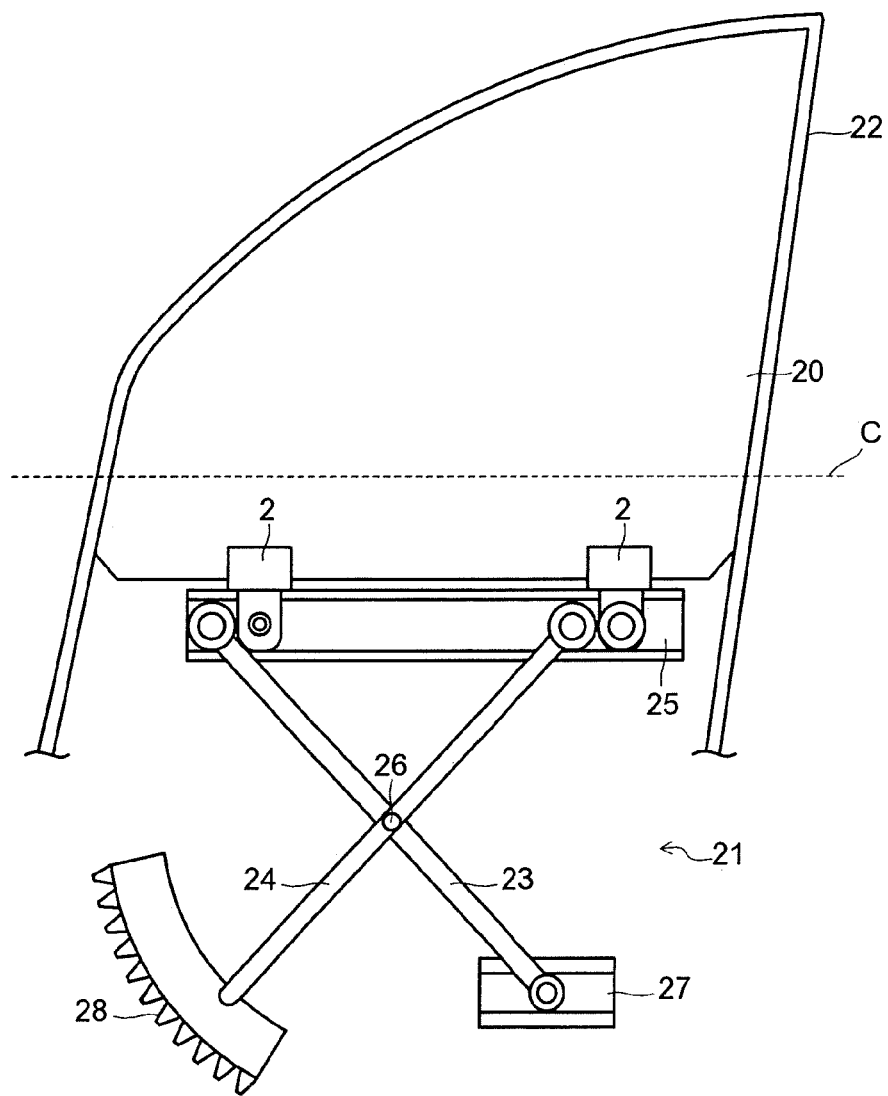
FIG. 4 is a schematic configuration diagram illustrating a window portion for an automobile vehicle having a lifting and lowering device to lift and lower a glass article in a vertical direction for the automobile vehicle as an example of the present invention.

FIG. 4 is a schematic configuration diagram illustrating a window portion of an automobile vehicle having a lifting and lowering device to vertically lift and lower the glass article for the automobile vehicle as an example of the present invention. A window glass plate 20 applied as a window glass of a front door or a rear door for an automobile vehicle is vertically lifted and lowered along a window frame 22 around an opening portion of the window by a lifting and lowering device 21, as illustrated in FIG. 4. The lifting and lowering device 21 of the example illustrated in FIG. 4 is an arm type regulator and is basically constitute by two arms 23 and 24, a lifting and lowering rail 25, and a fixed rail 27. Note that a broken line C in FIG. 4 schematically illustrates a position of a lower end of the opening portion of the window of the automobile vehicle.

The two arms 23 and 24 are coupled with each other rotatably around a fulcrum 26 as an axis. The lifting and lowering rail 25, extending in a horizontal direction, is a rail capable of moving up and down in relation to a vehicle door. Upper ends of the arms 23 and 24 are both mounted on the lifting and lowering rail 25 slidably in the horizontal direction. Further, the fixed rail 27, extending in the horizontal direction, is a rail fixed to the vehicle door. A lower end of the arm 23 is mounted on the fixed rail 27 slidably in the horizontal direction, and a lower end of the arm 24 is connected to a gear 28 of the regulator. In the above configuration, when the gear 28 is driven, the arms 23 and 24 rotate around the fulcrum 26 as the axis to thereby lift and lower the lifting and lowering rail 25, and in accordance with up and down of the lifting and lowering rail 25, the window glass 20 is lifted and lowered. Note that the lifting and lowering device is not limited to the arm type regulator and may be a wire type regulator and the like.

The window glass plate 20 illustrated in FIG. 4 has two holders 2 in a lower edge thereof. The holder 2, into a recessed portion of which the lower edge of the glass plate 20 is fitted, is bonded to the window glass plate 20 via an adhesive in the recessed portion of the holder 2. Meanwhile, a leg portion (corresponding to the leg portion 13 in FIG. 3) of the holder 2 is mounted on the lifting and lowering rail 25 of the lifting and lowering device 21. In other words, the window glass plate 20 is coupled with the lifting and lowering rail 25 via the holder 2. Therefore, the window glass plate 20 is integrally lifted and lowered by up and down of the lifting and lowering rail 25 of the lifting and lowering device 21.

The holder is installed in the glass plate via the adhesive. As the adhesive, a polyurethane based adhesive or a silicon based adhesive can be cited. The polyurethane based adhesive is preferable among the above.

Next, a procedure for fabricating the glass article by installing the holder in the glass plate via the adhesive will be described.

In installing the holder in the glass plate via the adhesive, first, a proper amount of adhesive is applied to the recessed portion of the holder. Then, a lower portion of the glass plate is pushed into the recessed portion of the holder in a manner that the recessed portion of the holder to which the adhesive has been applied is fitted into the first coverage area of a lower edge area of the glass plate, to thereby install the holder in the glass plate.

Thereafter, the glass article in which the holder is installed in the glass plate via the adhesive is let to stand as it is or put into a heating furnace or a drying furnace, to thereby cure the adhesive between the holder and the glass plate. When the adhesive is cured, the holder and the glass plate are bonded via the adhesive, so that the holder and the glass plate are fixed. By this procedure, the holder is mounted on the glass plate.

The holder is preferably mounted in a manner to cover the first coverage area of the functional film formed on one of the principal surfaces of the glass plate, from the lower edge side of the glass plate. It suffices that the holder covers at least a part of the first coverage area of the functional film, and the holder may cover the whole first coverage area depending on a shape of the holder. In other words, the holder is provided within the first coverage area. As described above, it is preferable, in view of film peeling, that the holder does not reach the second coverage area by straddling the boundary area between the first coverage area and the second coverage area.

When used as the window glass of the automobile vehicle, the glass article of the present invention preferably further satisfies either one of following (1) and (2). It is more preferable in particular that both (1) and (2) are satisfied in view of attainment of both ultraviolet absorbing ability and abrasion resistance.

(1) The glass article is characterized in that an ultraviolet transmittance $Tuv_1$[%] measured based on ISO-9050 (year 1990) is 3.0[%] or less in a minimum film thickness portion of the second coverage area and that an ultraviolet transmittance $Tuv_2$[%] measured based on ISO-9050 (year 1990) after an accelerated weathering test in a portion where an ultraviolet transmittance Tuv[%] measured based on ISO-9050 (year 1990) is 1.0[%] in the second coverage area is 4.0[%] or less, the accelerated weathering test being a test in which the aforementioned portion is left for 1000 hours in a super xenon weather meter (SX75 by Suga Test Instruments Co., Ltd.) whose condition is set as 150 W/m$^2$ (300 to 400 nm) in irradiance, 83° C. in black panel temperature, and 50 RH % in humidity.

(2) The glass article is characterized in that a haze value ($H_1$) in a maximum film thickness portion of the second coverage area is 1.0[%] or less before an abrasion test of 1000 rotation to the surface of the functional film by a CS-10F abrasion wheel in accordance with JIS-R3212 (year 1998) by using a Taber abrasion tester and that a difference ($\Delta H$) ($\Delta H = H_2 - H_1$) between the haze value ($H_1$) before the abrasion test and a haze value ($H_2$) in the maximum film thickness portion after the abrasion test is 5.0[%] or less.

In the minimum film thickness portion of the second coverage area of the glass article of the present invention, the ultraviolet transmittance $Tuv_1[\%]$ measured based on ISO-9050 (year 1990) is preferably 2.0[%] or less and more preferably 1.5[%] or less, and $Tuv_2[\%]$ after the accelerated weathering test is preferably 3.5[%] or less and more preferably 3.0[%] or less, the accelerated weathering test being the test in which the portion where Tuv[%] is 1.0[%] in the second coverage area of the glass article is left for 1000 hours in the super xenon weather meter (SX75 by Suga Test Instruments Co., Ltd.) whose condition is set as 150 W/m² (300 to 400 nm) in irradiance, 83° C. in black panel temperature, and 50 RH % in humidity.

If $Tuv_1[\%]$ of the minimum film thickness portion is 2.0[%] or less and $Tuv_2[\%]$ after the accelerated weathering test in the portion where Tuv[%] is 1.0[%] is 3.5[%] or less, the glass article has a sufficient ultraviolet absorbing ability in a broad range in the glass surface and exhibits a sufficient weather resistance when the glass article is practically used as an automobile window glass.

The haze value ($H_1$) in the maximum film thickness portion of the second coverage area is preferably 0.5 [%] or less and more preferably 0.3[%] or less before the abrasion test of 1000 rotation to the surface of the functional film of the glass article of the present invention by the CS-10F abrasion wheel in accordance with JIS-R3212 (year 1998) by using the Taber abrasion tester, and the haze value ($H_2$) after the abrasion test is preferably 4.0[%] or less and more preferably 3.0[%] or less.

If the haze value ($H_1$) before the abrasion test in the maximum film thickness portion is 1.0[%] or less and the difference ($\Delta H$) ($\Delta H = H_2 - H_1$) between the haze values before the abrasion test and after the abrasion test is 5.0[%] or less, the abrasion resistance is high, so that significant visibility deterioration can be prevented.

A material of the glass plate usable in the present invention is not limited in particular and there can be cited inorganic glass such as soda lime glass (for example, float plate glass, heat absorbing plate glass, ultraviolet absorbing plate glass, heat absorbing and ultraviolet absorbing plate glass, and so on), borosilicate glass, non-alkali glass, and quartz glass, and organic glass such as polycarbonate resin and acrylic resin. The inorganic glass is more preferable. It is more preferable that such a glass plate, when used as a window glass for an automobile vehicle, is used as tempered glass having been subjected to tempering or laminated glass having been subjected to laminating.

It suffices that the liquid composition used for forming the functional film of the present invention is one capable of forming a coating film having a necessary function. For example, there can be cited a liquid composition composed of an ultraviolet absorbent (a), a dispersing agent (c), a binder component (e), and a liquid medium (f). The liquid composition may further contain an infrared absorbent (b), a chelating agent (d) capable of forming a complex with the infrared absorbent (b), and a silica fine particle (g) for improving abrasion resistance of the functional film.

As a method for forming the functional film of the present invention, there can be cited a method which includes (A) a process of applying the liquid composition as the coating solution on the glass plate to thereby form an applied film, and (B) a process of removing the organic solvent from the applied film and curing the above-described binder component (e) to thereby form the coating film.

First, in the process (A), the liquid composition is applied on the glass plate to thereby form the applied film. As an application method of the liquid composition on the glass plate, a common application method such as spin coating, dip coating, spray coating, flow coating, or die coating can be used. The flow coating can be suitably used in particular in a case of a glass plate having a curved surface shape.

When the functional film of the present invention is formed, after the coating solution is applied on the principal surface of the glass plate in the process (A), the glass plate on which the coating solution is applied is held with a coated surface upward, and a part of the coating solution in a coated area positioned on the lower edge side of the glass plate and having a certain width from the lower edge side toward the upper edge side is removed by using a blade or the like, to thereby make a thinner film area. Then, after curing, the area having been made to the thinner film by using the blade or the like becomes the first coverage area of the functional film and the area where the coating solution is not removed becomes the second coverage area of the functional film.

Next, as the process (B), the process of removing the organic solvent from the applied film and curing the binder component (e) is performed to thereby form the coating film.

The applied film of the coating solution described above contains the volatile organic solvent or the like, and thus, after the applied film is formed by the coating solution, first, the volatile component is removed by evaporation. Removal of the volatile component is preferably performed by heating and/or pressure-reduced drying.

After the volatile component is removed from the applied film as described above, the binder component (e) is cured. This reaction can be performed at a normal temperature or under heating. In a case where a cured product (for example, a silicon oxide-based matrix) is to be generated under heating, since the cured product contains an organic material, an upper limit of a heating temperature thereof is preferably 220° C., and particularly preferably 210° C. Since the cured product can be generated also at the room temperature, a lower limit of the heating temperature thereof is not limited in particular. However, if acceleration of the reaction by heating is intended, the lower limit of the heating temperature is preferably 60° C. and more preferably 80° C. Therefore, the heating temperature is preferably 60 to 220° C. and more preferably 80 to 210° C. A heating time is preferably a few minutes to a few hours, though depending on the coating solution used for formation of the coating film.

In a case where the glass article of the present invention is applied to an automobile door, an upper edge side non-coverage area of a predetermined width may be provided in an area along an upper edge of a window glass plate, the width corresponding to a width of a part housed in a window glass plate housing portion of an upper frame of an opening portion of the door when the window glass plate is lifted and the window is closed in the automobile door. Providing the upper edge side non-coverage area where the functional film is not formed prevents rubbing of the functional film in the window glass plate housing portion of the upper frame, to thereby able to suppress deterioration of appearance by scratches in the functional film even when the window glass plate is lifted and lowered repeatedly.

EXAMPLES

Hereinafter, the present invention will be described in detail by way of examples and comparative examples. Example 1 to Example 4 are examples while Example 5 and Example 6 are comparative examples. However, the present invention is not limited to the following description.

Chemical compounds, commercial products (brand names) or the like used for preparing a liquid composition used for forming each functional film in each example will be listed below.

(Ultraviolet Absorbent (a))
Silylated ultraviolet absorbent (11): 4-(2-hydroxyl-3-(3-(trimethoxysilyl) propoxy) propoxy)-2,2',4'-trihydroxybenzophenone which is synthesized in a preparation example below.

(Infrared Absorbent (b))
ITO ultra-fine particle: manufactured by Mitsubishi Materials Corporation (20 nm in average primary particle size, 55 nm in average dispersed particle size), hereinafter, onveniently abbreviated to "ITO".

(Dispersing Agent (c))
DISPERBYK-190: manufactured by BYK Chemie Japan K.K., 40 mass % aqueous solution of dispersing agent of 10 mgKOH/g in acid value and 2200 in molecular weight, hereinafter, conveniently abbreviated to "BYK190".

(Chelating Agent (d))
NONPOL PMA-50 W: manufactured by NOF CORPORATION, maleic acid polymer aqueous solution of an aqueous solution with 40 to 48 mass % solid content, having both function as a chelating agent and function as acid, hereinafter, conveniently abbreviated to "PMA-50 W".

(Binder Component (e))
SR-SEP: manufactured by Sakamoto Yakuhin Kogyo Co., Ltd., sorbitol-based polyglycidylether.

(Liquid Medium (f))
Solmix AP-1: manufactured by Japan Alcohol Trading Co., Ltd., a mixed solvent of ethanol:2-propanol:methanol=85.5: 13.4:1.1 (mass ratio).

(Silica Fine Particle (g))
Methanol silica sol: manufactured by Nissan Chemical Industries, Ltd., colloidal silica where silicon oxide fine particles (30 mass %) with an average primary particle size of 10 to 20 nm are dispersed in methanol.
IPA-ST: manufactured by Nissan Chemical Industries, Ltd., colloidal silica where silicon oxide fine particles (30 mass %) with an average primary particle size of 10 to 15 nm are dispersed in isopropyl alcohol.

<Preparation Example of Silylated Ultraviolet Absorbent Solution>
There were charged 49.2 g of 2,2',4,4'-tetrahydroxybenzophenone (manufactured by BASF Corporation), 123.2 g of 3-glycidoxypropyltrimethoxysilane (manufactured by Shin-Etsu Chemical Co., Ltd.), 0.8 g of benzyltriethylammonium chloride (manufactured by Junsei Chemical Co., Ltd.), and 100 g of butyl acetate (manufactured by Junsei Chemical Co., Ltd.), heated to 60° C. while being stirred, dissolved, then heated to 120° C. to be reacted for four hours, whereby a silylated ultraviolet absorbent solution with a solid content concentration of 63 mass % was obtained.

<Preparation Example of ITO Dispersion Liquid>
There were dispersing processed 11.9 g of ITO ultra-fine particles, 3.0 g of DISPERBYK-190, and 24.2 g of Solmix AP-1 for 48 hours by using a ball mill, subsequently Solmix AP-1 was further added and they were diluted such that an ITO solid content concentration was 20 mass %, whereby an ITO dispersion liquid was obtained.

<Glass Plate Having Been Used>
Kind of glass: there was used a high heat-absorbing green glass (UVFL manufactured by Asahi Glass Co., Ltd), having a plate thickness of 3.5 mm and a size (height 540 mm, width 880 mm).

Example 1

There were charged 11.7 g of silylated ultraviolet absorbent solution, 39.8 g of methyl ethyl ketone, 8.6 g of methanol, 18.0 g of pure water, 14.0 g of tetraethoxysilane, 0.8 g of SR-SEP, 0.18 g of PMA-50 W, and 0.01 g of maleic acid, stirred at 50° C. for two hours, and subsequently, 7.0 g of ITO dispersion liquid was added, whereby a liquid composition 1 with a solid content concentration of 13% was obtained.

The liquid composition 1 was applied to a concave surface of the glass plate by a flow coating method. In the application process, the coating solution was able to be applied without coating omission while liquid splitting was suppressed. Besides, flowing-out of the coating solution to a convex surface did not occur.

The glass plate on which the coating solution was applied was held with the concave surface upward, and thereafter, from a lower edge toward an upper edge of the concave surface of the glass plate, a part of the coating solution in a certain area (a lower edge area with a width of 4 cm from the lower edge toward the upper edge) is removed by using a blade.

Next, the glass plate was loaded onto a conveyer with the concave surface downward and sent to a heating furnace to be dried, whereby on the concave surface of the glass plate there was formed a functional film having a first coverage area having a first film thickness and a second coverage area having a second film thickness whose maximum film thickness is larger than the first film thickness. After taken out from the heating furnace, the glass plate was conveyed with the concave surface thereof upward.

Next, a holder to whose recessed portion a polyurethane-based adhesive is applied was pushed from a lower portion of the glass plate in a manner to cover a part of the first coverage area of the functional film. Thereafter, the glass plate with the holder was put into a drying furnace to cure the adhesive. Thereby, a glass article was fabricated.

Figure 5:
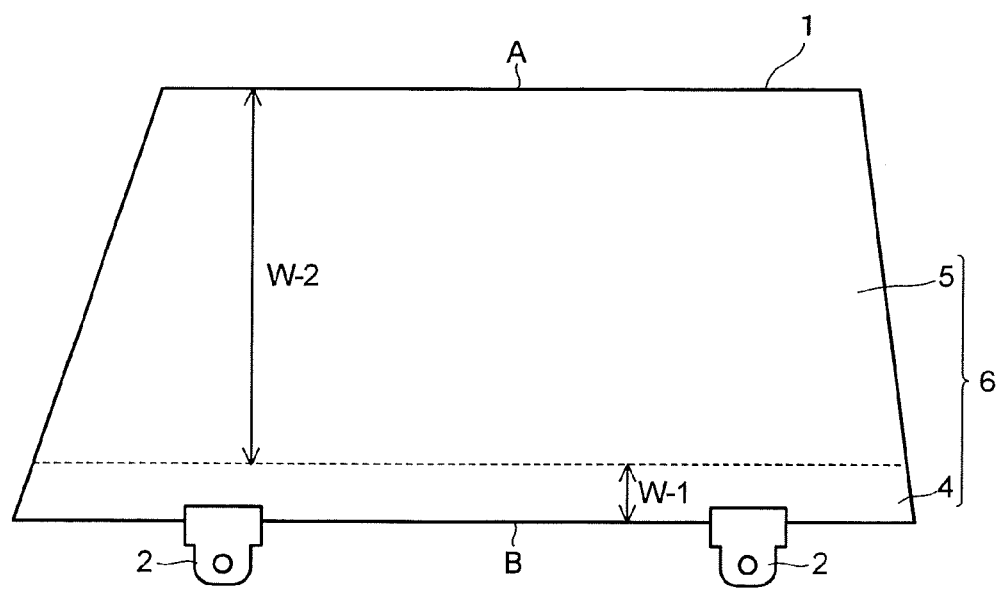
FIG. 5 is a front view illustrating a glass article fabricated in Example 1.
Figure 6:
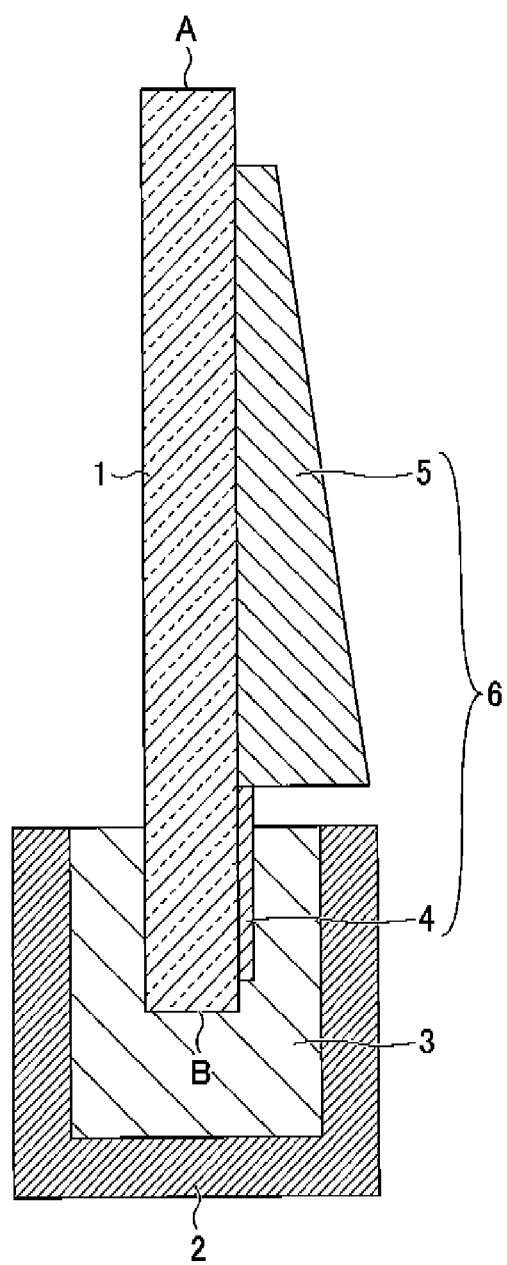
FIG. 6 is a side view illustrating another one of the examples of the glass article of the present invention.

FIG. 5 is a front view illustrating the glass article fabricated in Example 1. In this glass article, as illustrated in FIG. 5, a width W-2 of the film in the second coverage area 5 formed in a main area of a principal surface of the glass plate 1 which extends from the upper edge A toward the lower edge B of the glass plate 1 is 50 cm, while a width W-1 of the film in the first coverage area 4 formed on a lower side of the second coverage area 5 along the lower edge B is 4 cm, and the holders 2 were provided within the area of the first coverage area 4.

Further, Table 1 lists a maximum film thickness and a minimum film thickness of the second coverage area 5 and a maximum film thickness and a minimum film thickness of the first coverage area 4 of the functional film 6. In this example, an area of the maximum film thickness of the second coverage area 5 of the functional film 6 is an area adjacent to the first coverage area 4 along the lower edge of the second coverage area 5, while an area of the minimum film thickness of the second coverage area 5 is an area along the upper edge A of the glass plate 1. Further, an area of the maximum film thickness of the first coverage area 4 is an area along the lower edge B of the glass plate 1 since the film thickness of the first coverage area 4 is almost uniform in this example.

Positions and widths of the first coverage area and the second coverage area, the maximum film thickness and the minimum film thickness of the second coverage area 5, the maximum film thickness and the minimum film thickness of the first coverage area 4, and so on which are described above are the same also in Examples 2 to 4.

In this example, functional film peeling is effectively suppressed by making the maximum film thickness of the first coverage area smaller than the maximum film thickness of the second coverage area, and making the maximum film thickness in the first coverage area smaller than the minimum film thickness in the second coverage area can suppress the functional film peeling in the first coverage area without impairing an effect of the functional film in the second coverage area, and is more preferable. The maximum film thickness in the first coverage area is preferably 1.0 μm or less and more preferably 0.5 μm or less.

Note that in FIG. 5, a boundary line portion between the first coverage area and the second coverage area is placed at a lower end of an opening portion of a window when the glass article is mounted on the window of an automobile vehicle.

Example 2

There were charged 11.7 g of silylated ultraviolet absorbent solution, 39.8 g of methyl ethyl ketone, 8.6 g of methanol, 18.0 g of pure water, 14.0 g of tetraethoxysilane, 0.8 g of SR-SEP, 0.18 g of PMA-50 W, and 0.01 g of maleic acid, stirred at 50° C. for two hours, and subsequently, 7.0 g of ITO dispersion liquid was added, whereby a liquid composition 1 with a solid content concentration of 13% was obtained.

The liquid composition 1 was applied to a concave surface of a glass plate by a flow coating method. In the application process, the coating solution was able to be applied without coating omission while liquid splitting was suppressed. Besides, flowing-out of the coating solution to a convex surface did not occur.

The glass plate on which the coating solution was applied was held with the concave surface upward, and thereafter, from a lower edge toward an upper edge of the concave surface of the glass plate, a part of the coating solution in a certain area (a lower edge area with a width of 4 cm from the lower edge toward the upper edge) was removed by using a blade.

Next, the glass plate was loaded onto a conveyer with the concave surface downward and sent to a heating furnace to be dried, whereby on the concave surface of the glass plate there was formed a functional film having a first coverage area having a first film thickness and a second coverage area having a second film thickness whose maximum film thickness is larger than the first film thickness. After taken out from the heating furnace, the glass plate was conveyed with the concave surface thereof upward.

Next, a long holder to whose recessed portion a polyurethane-based adhesive is applied was pushed from a lower portion of the glass plate in a manner to cover the whole first coverage area of the functional film. Thereafter, the glass plate with the holder was put into a drying furnace to cure the adhesive. Thereby, a glass article was fabricated.

Example 3

There were charged 11.7 g of silylated ultraviolet absorbent solution, 24.2 g of acetone, 24.2 g of acetonitrile, 18.0 g of pure water, 14.0 g of tetraethoxysilane, 0.8 g of SR-SEP, 0.18 g of PMA-50 W, and 0.01 g of maleic acid, stirred at 50° C. for two hours, and subsequently, 7.0 g of ITO dispersion liquid was added, whereby a liquid composition 3 with a solid content concentration of 13% was obtained.

The liquid composition 3 was applied to a concave surface of a glass plate by a flow coating method. In the application process, the coating solution was able to be applied without coating omission while liquid splitting was suppressed. Besides, flowing-out of the coating solution to a convex surface did not occur.

The glass plate on which the coating solution was applied was held with the concave surface upward, and thereafter, from a lower edge toward an upper edge of the concave surface of the glass plate, a part of the coating solution in a certain area (a lower edge area with a width of 4 cm from the lower edge toward the upper edge) was removed by using a blade.

Next, the glass plate was loaded onto a conveyer with the concave surface downward and sent to a heating furnace to be dried, whereby on the concave surface of the glass plate there was formed a functional film having a first coverage area having a first film thickness and a second coverage area having a second film thickness whose maximum film thickness is larger than the first film thickness. After taken out from the heating furnace, the glass plate was conveyed with the concave surface thereof upward.

Next, a holder to whose recessed portion a polyurethane-based adhesive is applied was pushed from a lower portion of the glass plate in a manner to cover a part of the first coverage area of the functional film. Thereafter, the glass plate with the holder was put into a drying furnace to cure the adhesive. Thereby, a glass article was fabricated.

Example 4

There were charged 13.5 g of silylated ultraviolet absorbent solution, 32.4 g of methyl ethyl ketone, 8.8 g of methanol, 18.6 g of pure water, 14.4 g of tetraethoxysilane, 0.8 g of SR-SEP, and 9.9 g of acetic acid, stirred at 50° C. for two hours, and subsequently, 1.5 g of IPA-ST was added, whereby a liquid composition 4 with a solid content concentration of 13% was obtained.

The liquid composition 4 was applied to a concave surface of a glass plate by a flow coating method. In the application process, the coating solution was able to be applied without coating omission while liquid splitting was suppressed. Besides, flowing-out of the coating solution to a convex surface did not occur.

The glass plate on which the coating solution was applied was held with the concave surface upward, and thereafter, from a lower edge toward an upper edge of the concave surface of the glass plate, a part of the coating solution in a certain area (a lower edge area with a width of 4 cm from the lower edge toward the upper edge) was removed by using a blade.

Next, the glass plate was loaded onto a conveyer with the concave surface downward and sent to a heating furnace to be dried, whereby on the concave surface of the glass plate there was formed a functional film having a first coverage area having a first film thickness and a second coverage area having a second film thickness whose maximum film thickness is larger than the first film thickness. After taken out from the heating furnace, the glass plate was conveyed with the concave surface thereof upward.

Next, a holder to whose recessed portion a polyurethane-based adhesive is applied was pushed from a lower portion of the glass plate in a manner to cover a part of the first coverage area of the functional film. Thereafter, the glass plate with the holder was put into a drying furnace to cure the adhesive. Thereby, a glass article was fabricated.

Example 5

There were charged 11.7 g of silylated ultraviolet absorbent solution, 39.8 g of methyl ethyl ketone, 8.6 g of methanol, 18.0 g of pure water, 14.0 g of tetraethoxysilane, 0.8 g of SR-SEP, 0.18 g of PMA-50 W, and 0.01 g of maleic acid, stirred at 50° C. for two hours, and subsequently, 7.0 g of ITO dispersion liquid was added, whereby a liquid composition 1 with a solid content concentration of 13% was obtained.

The liquid composition 1 was applied to a concave surface of a glass plate by a flow coating method. In the application process, the coating solution was able to be applied without coating omission while liquid splitting was suppressed. Besides, flowing-out of the coating solution to a convex surface did not occur.

The glass plate on which the coating solution was applied was held with the concave surface upward, and thereafter, loaded onto a conveyer with the concave surface downward and sent to a heating furnace to be dried, whereby a functional film was formed on the concave surface of the glass plate. After taken out from the heating furnace, the glass plate was conveyed with the concave surface thereof upward.

The formed functional film was held with the concave surface upward in relation to the glass plate on which the coating solution was applied, and thereafter, a part of the coating solution in a certain area was not removed from a lower edge toward an upper edge of the glass plate by using a blade, so that there exists neither a first coverage area having a first film thickness nor a second coverage area having a second film thickness whose maximum film thickness is larger than the first film thickness as in Example 1 to Example 4.

Next, a holder to whose recessed portion a polyurethane-based adhesive is applied was pushed from a lower portion of the glass plate in a manner to cover a part of the functional film. Thereafter, the glass plate with the holder was put into a drying furnace to cure the adhesive. Thereby, a glass article was fabricated.

In the above-described functional film, a film thickness of a holder mounting portion thereof is about 10000 nm, which is larger than film thicknesses of the first coverage areas of Examples 1 to 4, and non-uniformity of film thicknesses was found in a surface.

Example 6

There were charged 13.5 g of silylated ultraviolet absorbent solution, 41.2 g of 1-methoxy-2-propanol, 18.6 g of pure water, 14.4 g of tetraethoxysilane, 0.8 g of SR-SEP, and 9.9 g of acetic acid, stirred at 50° C. for two hours, and subsequently, 1.5 g of methanol silica sol is added, whereby a liquid composition 6 with a solid content concentration of 13% was obtained.

The liquid composition 6 was applied to a concave surface of a glass plate by a flow coating method. In the application process, the coating solution was able to be applied without coating omission while liquid splitting was suppressed. Besides, flowing-out of the coating solution to a convex surface did not occur.

The glass plate to which the coating solution was applied was held with the concave surface upward, and thereafter, loaded onto a conveyer with the concave surface downward and sent to a heating furnace to be dried, whereby a functional film was formed on the concave surface of the glass plate. After taken out from the heating furnace, the glass plate was conveyed with the concave surface thereof upward.

In the formed functional film, similar to in Example 5, a part of the coating solution in a certain area was not removed from a lower edge toward an upper edge of the glass plate by using a blade or the like, so that there exists neither a first coverage area having a first film thickness nor a second coverage area having a second film thickness whose maximum film thickness is larger than the first film thickness, as in Example 1 to Example 4.

Next, a holder to whose recessed portion a polyurethane-based adhesive is applied was pushed from a lower portion of the glass plate in a manner to cover a part of the functional film. Thereafter, the glass plate with the holder was put into a drying furnace to cure the adhesive. Thereby, a glass article was fabricated.

In the above-described functional film, a film thickness of a holder mounting portion thereof is about 10000 nm, which is larger than film thicknesses of the first coverage areas of Examples 1 to 4, and non-uniformity of film thickness was found in a surface.

[Peeling of Functional Film]

The glass plate with the holder was put into the drying furnace to cure the adhesive, and thereafter, the glass article was obtained. Subsequently, existence or absence of peeling of the functional film from the glass plate was visually confirmed. Evaluation criteria are listed below.

A: Peeling of the functional film from the glass plate cannot be confirmed visually.

B: Peeling of the functional film from the glass plate can be confirmed visually.

[Accelerated Weathering Test]

Each of the glass articles obtained in Example 1 to Example 6 was subjected to the accelerated weathering test in which the glass article was left for 1000 hours in the super xenon weather meter (SX75 by Suga Test Instruments Co., Ltd.) whose condition was set as 150 W/m$^2$ (300 to 400 nm) in irradiance, 83° C. in black panel temperature, and 50 RH % in humidity.

[Taber Abrasion Test]

Each of the glass articles obtained in Example 1 to Example 6 was subjected to the abrasion test of 1000 rotation by the CS-10F abrasion wheel in accordance with JIS-R3212 (year 1998).

[Measurement of Tuv[%]]

In the glass article, spectral characteristics of the minimum film thickness portion of the second coverage area and another portion of the second coverage area of the functional film before the accelerated weathering test were measured by using a spectrophotometer (U-4100 manufactured by Hitachi, Ltd.), and ultraviolet transmittances (Tuv[%]) were calculated based on ISO-9050 (year 1990) respectively. The ultraviolet transmittance of the minimum film thickness portion of the second coverage area was defined as $Tuv_1$[%]. Next, in the glass article, the portion whose Tuv[%] was 1.0[%] in the second coverage area of the functional film before the accelerated weathering test was subjected to the accelerated weathering test, the spectral characteristic was measured by using the spectrophotometer (U-4100 manufactured by Hitachi, Ltd.) after the test, and the ultraviolet transmittance (Tuv[%]) was calculated based on ISO-9050 (year 1990). The ultraviolet transmittance after the test was defined as $Tuv_2$[%].

[Measurement of Haze Value[%]]

In the glass article, the haze values[%] of the maximum film thickness portion of the second coverage area of the functional film before and after the Taber abrasion test were measured by a haze meter (Haze Gard Plus manufactured by BYK-Gardner). The haze value of the maximum film thickness portion in the second coverage area before the test was defined as $H_1$[%], the haze value of that portion after the test was defined as $H_2$[%], and the difference between the haze values of that portion before and after the test was defined as $\Delta H$ (=$H_1$−$H_2$)[%].

TABLE 1

|  |  | Example | | | | Comparative example | |
| --- | --- | --- | --- | --- | --- | --- | --- |
|  |  | Ex1 | Ex2 | Ex3 | Ex4 | Ex5 | Ex6 |
| Liquid composition [g] | Silylated ultraviolet absorbent solution | 11.7 | 11.7 | 11.7 | 13.5 | 11.7 | 13.5 |
|  | Methyl ethyl ketone | 39.8 | 39.8 | 0.0 | 32.4 | 39.8 | 0.0 |
|  | Methanol | 8.6 | 8.6 | 0.0 | 8.8 | 8.6 | 0.0 |
|  | Acetone | 0.0 | 0.0 | 24.2 | 0.0 | 0.0 | 0.0 |
|  | Acetonitrile | 0.0 | 0.0 | 24.2 | 0.0 | 0.0 | 0.0 |
|  | 1-methoxy-2-propanol | 0.0 | 0.0 | 0.0 | 0.0 | 0.0 | 41.2 |
|  | Pure water | 18.0 | 18.0 | 18.0 | 18.6 | 18.0 | 18.6 |
|  | Tetraethoxysilane | 14.0 | 14.0 | 14.0 | 14.4 | 14.0 | 14.4 |
|  | SR-SEP | 0.8 | 0.8 | 0.8 | 0.8 | 0.8 | 0.8 |
|  | PMA-50W | 0.18 | 0.18 | 0.18 | 0.00 | 0.18 | 0.00 |
|  | Maleic acid | 0.01 | 0.01 | 0.01 | 0.0 | 0.01 | 0.0 |
|  | Acetic acid | 0.0 | 0.0 | 0.0 | 9.9 | 0.0 | 9.9 |
|  | ITO dispersion liquid | 7.0 | 7.0 | 7.0 | 0.0 | 7.0 | 0.0 |
|  | Silica fine particle (IPA-ST) | 0.0 | 0.0 | 0.0 | 1.5 | 0.0 | 0.0 |
|  | Silica fine particle (methanol silica sol) | 0.0 | 0.0 | 0.0 | 0.0 | 0.0 | 1.5 |
| Constitution of glass article | Second coverage area of functional film (maximum film thickness) [μm] | 5.5 | 5.4 | 5.4 | 5.5 | 5.5 | 5.4 |
|  | Second coverage area of functional film (minimum film thickness) [μm] | 1.1 | 1.2 | 1.1 | 1.2 | 1.2 | 1.1 |
|  | First coverage area of functional film (maximum film thickness) [μm] | 0.1 | 0.8 | 0.3 | 0.3 | 10.0 | 10.0 |
|  | First coverage area of functional film (minimum film thickness) [μm] | 0.0 | 0.0 | 0.0 | 0.0 | 5.5 | 5.4 |
|  | Position of holder | c | d | c | c | c | c |
| Evaluation result | Peeling of functional film | A | A | A | A | B | B |
|  | $Tuv_1$ [%] | 1.9 | 1.9 | 1.8 | 1.0 | 1.9 | 0.4 |
|  | $Tuv_2$ [%] | 3.4 | 3.4 | 3.4 | 3.3 | 3.4 | 3.2 |
|  | $H_1$ [%] | 0.4 | 0.4 | 0.4 | 0.3 | 0.4 | 0.2 |
|  | ΔH [%] | 3.0 | 3.0 | 3.5 | 3.0 | 3.0 | * |

Note,
"Ex" in Table 1 means Example.

In a field of the position of the holder in Table 1, "c" indicates that two holders were provided in a manner to cover a part of the first coverage area, while "d" indicates that one long holder was provided in a manner to cover the first coverage area and to cover a major part of a length. Further, in a field of ΔH, a symbol * indicates that measurement was impossible due to peeling of the functional film from the glass plate.

Table 1 shows that peeling of the functional film from the glass plate did not occur in each of Example 1 to Example 4. Further, $Tuv_1$ was 3.0% or less, $Tuv_2$ after the accelerated weathering test was 4.0% or less, $H_1$ before the Taber abrasion test was 1.0% or less, and ΔH before and after the Taber abrasion test was 5.0% or less.

Meanwhile, peeling of the functional film from the glass plate occurred in Example 5 and Example 6. In Example 6, the haze value was unmeasurable due to peeling of the functional film from the glass plate after the Taber abrasion test.

A glass article of the present invention has both excellent ultraviolet absorbing ability and abrasion resistance. Therefore, the glass article of the present invention can be applied to a window glass for a vehicle of an automobile or the like, a window glass for a construction material mounted on a structure such as a building, and the like.

What is claimed is:

1. A glass article comprising:
   a glass plate having a contour shape having an upper edge and a lower edge;
   a functional film formed on at least one of principal surfaces of the glass plate; and
   a holder having a recessed portion into which the lower edge of the glass plate is fitted,
   wherein the functional film has a first coverage area and a second coverage area, the second coverage area being formed in a manner to cover the principal surface extending from the upper edge toward the lower edge of the glass plate, the first coverage area being formed on a lower side of the second coverage area, along the lower edge, and a maximum film thickness of the first coverage area being smaller than a maximum film thickness of the second coverage area, and
   the holder is provided on a lower edge side of the glass plate, within the first coverage area of functional film, via an adhesive in the recessed portion.

2. The glass article according to claim 1, wherein the maximum film thickness of the first coverage area is smaller than a minimum film thickness of the second coverage area.

3. The glass article according to claim 2, wherein the maximum film thickness of the first coverage area is 1.0 μm or less.

4. The glass article according to claim 3, wherein the maximum film thickness of the first coverage area is 0.5 μm or less.

5. The glass article according to claim 1, wherein a difference between the maximum film thickness and a minimum film thickness of the first coverage area is smaller than a difference between the maximum film thickness and the minimum film thickness of the second coverage area.

6. The glass article according to claim 1,
wherein the functional film is a functional film which absorbs ultraviolet ray or a functional film which absorbs ultraviolet ray and infrared ray.

7. The glass article according to claim 1,
wherein an ultraviolet transmittance $Tuv_1$[%] measured based on ISO-9050 (year 1990) is 3.0[%] or less in a minimum film thickness portion of the second coverage area, and
an ultraviolet transmittance $Tuv_2$[%] measured based on ISO-9050 (year 1990) is 4.0[%] or less, $Tuv_2$ is measured in a portion whose ultraviolet transmittance Tuv [%] measured based on ISO-9050 (year 1990) is 1.0[%] in the second coverage area after the portion is left for 1000 hours in a super xenon weather meter (SX75 by Suga Test Instruments Co., Ltd.) whose condition is set as 150 W/m² (300 to 400 nm) in irradiance, 83° C. in black panel temperature, and 50 RH % in humidity.

8. The glass article according to claim 1,
wherein a haze value ($H_1$) in the maximum film thickness portion of the second coverage area before an abrasion test of 1000 rotation to the functional film by a CS-10F abrasion wheel in accordance with JIS-R3212 (year 1998) is 1.0[%] or less, and
wherein a difference ($\Delta H$) ($\Delta H = H_2 - H_1$) between the haze value ($H_1$) before the abrasion test and a haze value ($H_2$) in the maximum film thickness portion after the abrasion test is 5.0[%] or less.

9. The glass article according to claim 1,
wherein the glass plate is a window glass mounted openably and closably by being lifted and lowered in a vertical direction in an opening portion of a window of an automobile vehicle, and
wherein, when the glass plate is lifted to close the opening portion, a main area of the second coverage area is provided to be placed in an opening area of the opening portion and a main area of the first coverage area is provided to be placed outside the opening area below the opening portion.

10. The glass article according to claim 1,
wherein the glass plate is the window glass mounted openably and closably by being lifted and lowered in the vertical direction in the opening portion of the window of the automobile vehicle,
wherein the glass plate is a curved glass plate which is curved to have a concave surface on an indoor side and a convex surface on an outdoor side of the automobile vehicle, and
wherein the functional film is formed in the concave surface.

\* \* \* \* \*